Dec. 13, 1966 A. R. SHEARD ETAL 3,291,648
MULTISTAGE THERMOELECTRIC DEVICE
Filed May 9, 1963 6 Sheets-Sheet 1

Inventors
Anthony Robert Sheard
Adam Gelbtuch
By
Cushman, Darby & Cushman
Attorneys Inventors By Attorneys Inventors By Attorneys

MULTISTAGE THERMOELECTRIC DEVICE

Filed May 9, 1963 6 Sheets-Sheet 4

Inventors

By

Attorneys

MULTISTAGE THERMOELECTRIC DEVICE

Filed May 9, 1963 6 Sheets-Sheet 5

Inventors

By

Attorneys

MULTISTAGE THERMOELECTRIC DEVICE

Inventors

By

Attorneys

United States Patent Office 3,291,648
Patented Dec. 13, 1966

3,291,648
MULTISTAGE THERMOELECTRIC DEVICE

Anthony Robert Sheard and Adam Gelbtuch, Langley, England, assignors to Frigistor Laboratories Limited, Langley, England Filed May 9, 1963, Ser. No. 279,102
Claims priority, application Great Britain, May 9, 1962, 17,917/62; June 27, 1962, 24,716/62
14 Claims. (Cl. 136—212)

This invention relates to a thermoelectric cooling device in which the heat paths to the highest (i.e., coolest) stage of the device are reduced to a minimum.

Thermoelectric cooling devices (Peltier devices) comprise electric circuits in which the current flows from one type of conducting member to another and back to a conducting member of the original type. For maximum performance semiconductor thermoelements of p- and n-type conductors are used as the conducting members of the two different types. At the present stage of the art the p-type members are normally alloys the principal constituents of which are bismuth antimony and tellurium and the n-type materials are alloys the principal constituents of which are bismuth selenium and tellurium. These elements are arranged electrically in series with adjacent elements being of opposite conductivity types. On passage of a suitable current alternate junctions become cooled while the other junctions are heated. For heat transfer "bridging" elements of metal of good heat and electrical conductivity such as copper silver or aluminium are placed at the junctions, those at the heated junctions being placed on one side of the chain and those at the cooled junctions being placed on the other side of the chain. Conveniently the thermoelements are not in direct contact with each other but are joined by the bridging members.

It is convenient to refer to the bridging members on the one side of the thermoelements as hot junction bridging members and those on the other side as cold junction bridging members although reversal of the current would make the cold junction bridging members hot and the hot junction bridging members cold. It should be noted that the current passes from hot junction bridging member to thermoelement of one type to cold junction bridging member to thermoelement of the other type and then back to a further hot junction bridging member and so forth. Such an arrangement is referred to herein as a "chain" of thermoelectric elements. The thermoelements and associated bridging members may be coiled up preferably in one plane, with the hot junction bridging members on one side of the plane and the cold junction bridging members on the other side of the plane.

According to the present invention there is provided a thermoelectric cooling device comprising a thermoelectric chain as hereinbefore defined in which two cold junction members hereinafter referred to as branching members are joined by a second chain, the second chain and that part of the first chain lying between the branching members being known as linking chains and those parts of the first chain lying beyond the branching members being known as terminal chains, one branching member being joined both to its terminal chain and to the second chain by thermoelements of one type and to the other linking chain by a thermoelement of the second type and the second branching member being connected both to its terminal chain and to the second chain by thermoelements of the second type and to the other linking chain by a thermoelement of the one type, and means for connecting the far ends of the two terminal chains to a suitable source of current.

It can be seen that this invention provides an electric circuit in which the full current passes through the terminal chains and is then divided to pass through the linking chains so that the current in the terminal chains is equal to the sum of the currents in the linking chains. Preferably the dimensions of the various thermoelements are selected so that each linking chain takes half the current supplied through the terminal chains.

The first chain forms the lower stage and the second chain the higher stage and together they form a two-stage cooling device, or they may form two stages of a device containing additional stages.

The invention includes the special case wherein the branching members are the only cold junction members of the first chain. Normally there will be more cold junction members than this in the first chain and it will then be desirable for suitable heat transfer means to be provided ensuring that each hot junction of the second chain is efficiently cooled by the cold junctions of the first chain and that all the cold junctions of the first chain partake in the cooling of one or more of the hot junctions of the second chain.

Preferably, each linking chain should contain the same number of elements as the other. In this case each hot junction in the second chain will correspond with a cold junction in the lower stage. If the resistance and other properties of the elements in the two linking chains have been carefully matched it is possible to make each higher stage hot junction integral with the corresponding lower stage cold junction. Such exact matching is not essential, but if it does not obtain it is preferred to separate the higher stage hot junctions from the lower stage cold junctions by a thin electrically insulating film which provides the minimum hindrance to the transfer of heat between them.

Conveniently, the higher stage should be joined symmetrically to the lower stage that is the two terminal chains should contain the same number of elements as each other.

It is desirable that any thermoelement in either linking chain of either conductivity type should have substantially double the electrical resistance of any thermoelement of the same conductivity type in the terminal chains.

In this preferred arrangement any hot junction in the higher stage will generate more heat than the corresponding cold junction in the lower stage. Hence it is preferred to have at least three times as many elements in the lower stage as in the higher stage, i.e., it is preferred that each terminal chain contains at least as many elements as either linking chain.

A thermoelectric cooling device may contain two such arrangements as have been described herein, connected electrically in series via the terminal chains with the insertion of the appropriate elements to ensure alternation of p- and n-type thermoelements and hence of hot and cold junctions. In this case the highest stage cold junctions may be used to cool two distinct spaced areas or the arrangement may be coiled in such a way that the highest stage cold junctions provided concentrated cooling.

A three-stage device may be provided by cooling the hot junctions of the lower stage of an arrangement of the type herein described by thermoelectric or other means. Alternatively two cold junction bridging members of the second stage may be joined by a third chain in such a way that the second and third chains taken together provide a thermoelectric cooling arrangement of the type described above. In this case it is preferred that the thermoelements of either type in the third stage and the thermoelements of the same type in the second stage lying between the second-to-third stage branching elements should have double the electrical resistance of the thermoelements of the same type in the remainder of the second chain and four times the electrical resistance of the thermoelements of the same type in the first stage terminal chains.

It is preferable that the external current leads should enter the device at terminal hot junctions of the lowest stage in order not to provide a heat path from ambient to the cold junctions.

It is necessary to use many more junctions in the lower stage than in the higher stage. It is also necessary that the cold junctions of the lower stage should be brought into good thermal contact with the hot junctions of the higher stage without establishing undesirable electrical current paths between junctions which on passage of electric current through the device attain different electrical potentials. This may be achieved for example by bedding the higher stage hot junctions and some or all of the lower stage cold junctions into or plating or depositing them onto one or more blocks or plates composed of material of good thermal conductivity and high electrical resistivity such as beryllium oxide or composed of a good conducting metal such as aluminium adequately insulated where necessary by an electrically insulating layer, such as an anodised oxide film or a thin layer of resin, which should be such as to provide the minimum resistance to the flow of heat. The resin films, may of course be used to bond the members to the heat transfer plate or block. Heat transfer plates, preferably of aluminium, anodised where electrical insulation is required, may be used for transferring heat from the branching members to the lower stage cold junction members. It is contemplated that a fluid which absorbs or emits large amounts of heat in changing state may be used for heat transfer.

In order that the invention may more readily be understood the following description is given, merely by way of example, reference being made to the accompanying drawings, in which.

Figure 1:
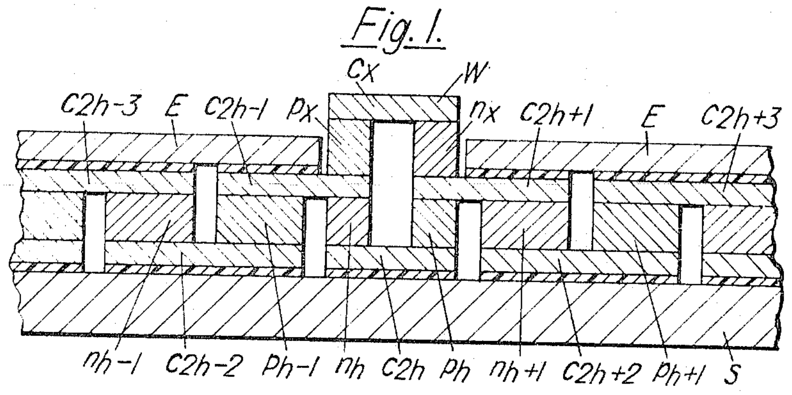
FIGURE 1 is a schematic representation of one form of device according to the invention.

In the drawings thermoelements of the n-type are referred to as $n$'s, thermoelements of the n-type as $p$'s and bridges as $c$'s. The $n$'s, $c$'s and $p$'s are further designated by subscript 1, 2, 3 . . . $r$. The $p$'s, $n$'s and $c$'s of the higher stage (second chain) are distinguished by dashes as $p'$'s, $n'$'s and $c'$'s, in FIGURES 8 and 9; and by the subscript $_x$ as $p_x$, $n_x$ and $c_x$ in FIGURES 1–7.

In a first preferred embodiment of the invention shown in FIGURE 1 the even-numbered bridges $c_{2h-2}$, $c_{2h}$, $c_{2h+2}$, etc., where $h$ is a whole number are arranged in one plane (but not necessarily in a straight line), the odd-numbered bridges $c_{2h-3}$, $c_{2h-1}$, $c_{2h+1}$, $c_{2h+3}$ etc., are arranged in another parallel plane, and the elements $n_{h-1}$, $p_{h-1}$, $n_h$, $p_h$, $n_{h+1}$, $p_{h+1}$, etc. are arranged in the plane these two planes, the two elements $p_x$ and $n_x$ and the bridging member $c_x$ being arranged on the opposite side of the plane of the odd-numbered bridges from that on which the even-numbered bridges are situated.

Figure 2:
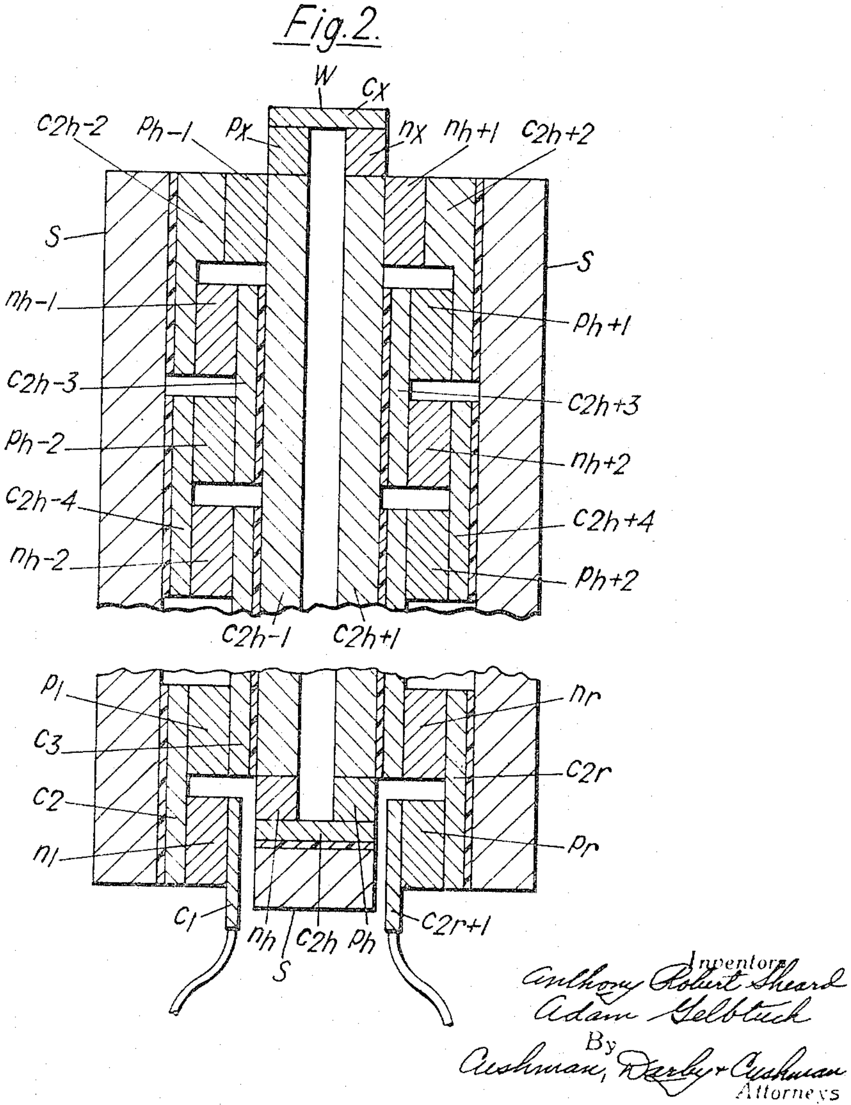
FIGURES 2 and 2A are a similar representation of further forms.
Figure 2A:
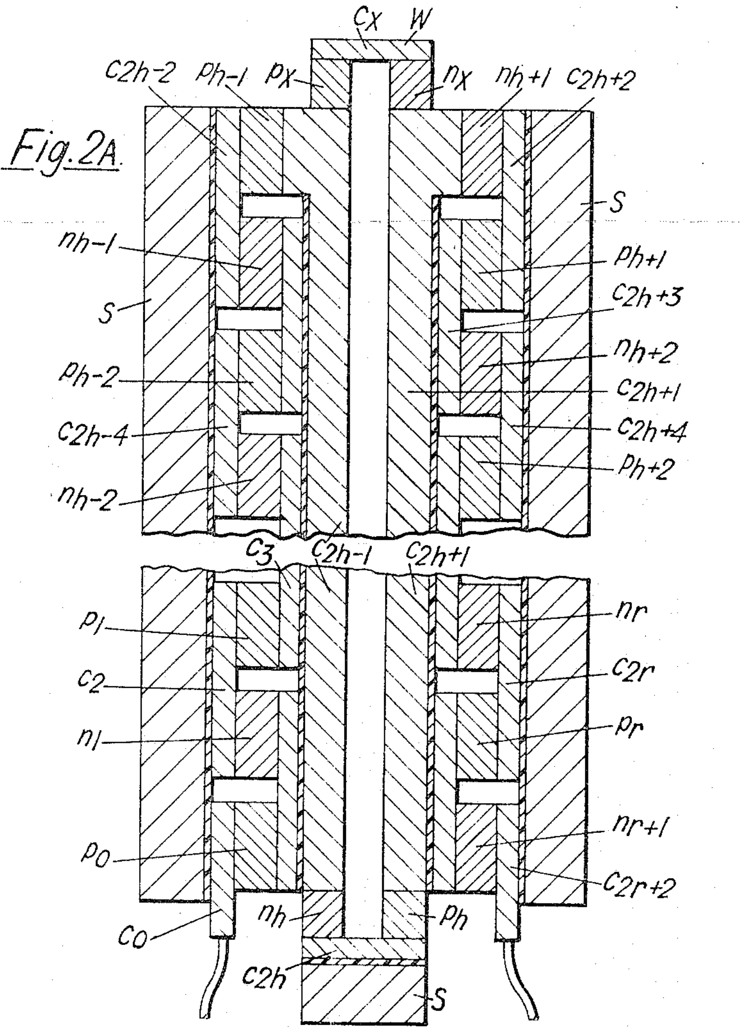

In the embodiments of the invention shown in FIGURES 2 and 2A the even-numbered bridges $c_2$, $c_4$ . . . $c_{2h-2}$ are arranged in one plane and are connected thermally to but electrically insulated from a heat sink S on one side, while on the opposite side of said bridges in an adjacent plane are arranged the thermoelements $n_1$, $p_1$, $n_2$, $p_2$ . . . $n_h$ $p_{h-1}$; in the next layer of a "sandwich" are arranged the odd-numbered bridges $c_1$, $c_3$ . . . $c_{2h-3}$ electrically insulated from but in thermal contact with the bridges $c_{2h-1}$ which together with $p_x$ and optionally a part of $c_x$ at one end and $n_h$ and optionally a part of $c_{2h}$ at the other end forms the next year of the sandwich. The bridges $c_x$ at one end and $c_{2h}$ at the other end serve to connect one half of the sandwich with the other half in which $c_{2h+1}$ corresponds to $c_{2h-1}$ and $n_x$ to $p_x$ and $p_h$ to $n_h$ the series of bridges $c_{2h+3}$ . . . $c_{2r+1}$ forming the next layer of the sandwich, the thermoelements $n_{h+1}$, $p_{h+1}$ . . . $n_r p_r$ forming the next layer, the bridges $c_{2h+2}$ . . . $c_{2r}$ forming the next layer and being in thermal contact with but electrically insulated from the final layer which is a heat sink S.

It will be noted that the components $n_h$, $c_{2h}$, $p_h$, $c_{2h+1}$, $n_x$, $c_x$, $p_x$ and $c_{2h-1}$ form a ring the $n$'s and $p$'s alternating round the ring, so that the current is divided in the two halves of the ring. The bridges $c_{2h-1}$ and $c_{2h+1}$ are additionally connected to thermoelements $p_{h-1}$ and $n_{h+1}$ these being the first elements of a chain. The even-numbered bridges are thermally connected to a heat sink, while the odd-numbered bridges are thermally connected to two heat transfer members.

In FIGURES 2 and 2A the said two heat transfer elements connecting the odd numbered bridges are also the "three-way" bridges by which the chains are connected to the ring. The cooled working surface of the device is the top surface of bridge $c_x$.

Several units as have been described may be combined in such a way as to increase the cooling surface of the highest stage.

In both forms the sandwiches may be held together by bolts of suitable insulating material, preferably nylon, which in the first embodiment penetrate through the sandwich, preferably at points such that they avoid the elements of thermoelectric material and pass from the heat conducting member to the heat sink or vice versa, and in the second embodiment optionally pass through the double sandwich from heat sink to heat sink.

Figure 4:
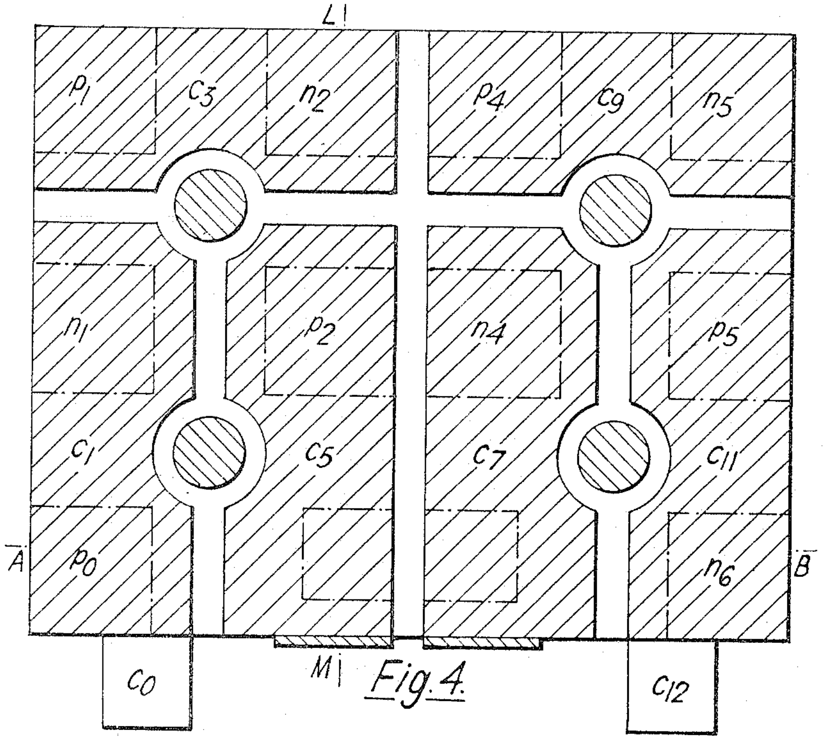
FIGURES 4, 5, 6 and 7 are four cross-sectional views of a "coiled up" version of the embodiment of FIGURE 3.
Figure 5:
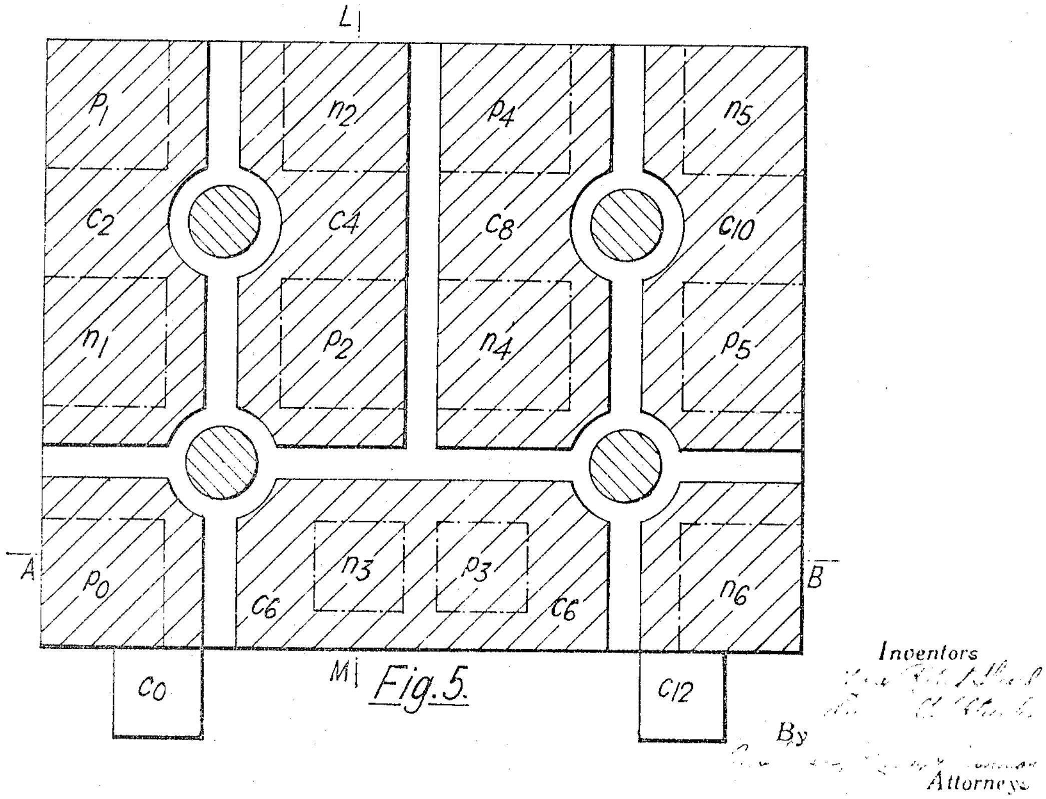
Figure 6:
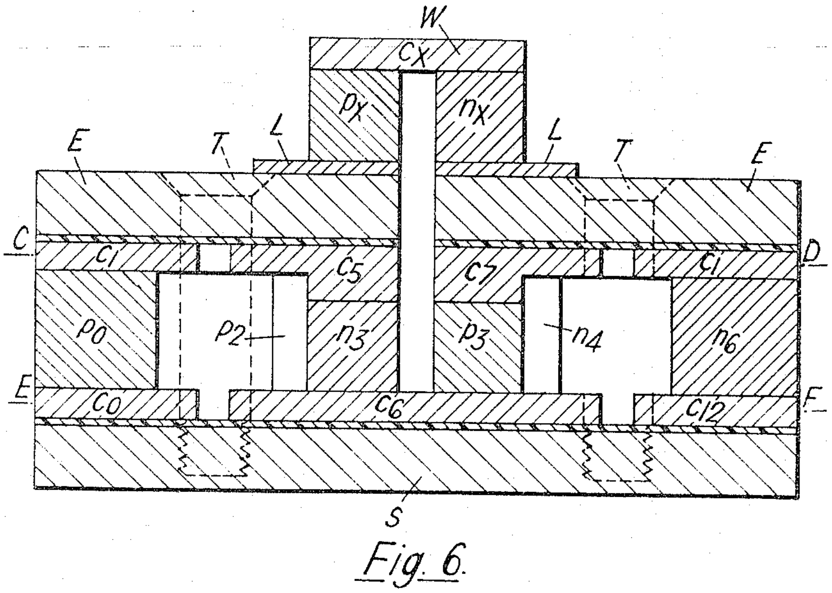
Figure 7:
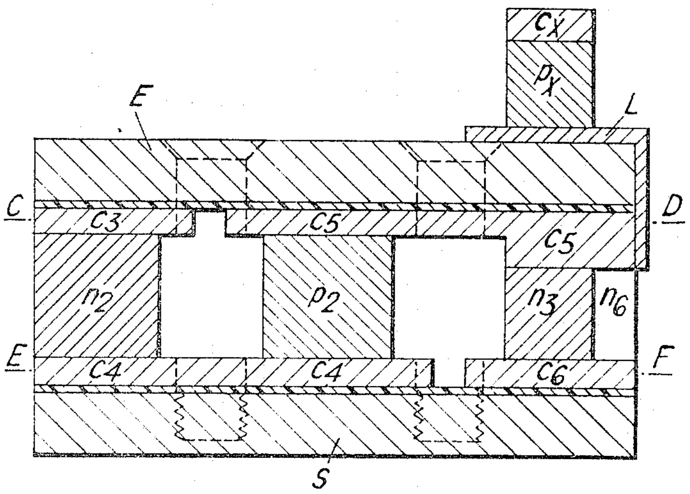

In the embodiment of FIGURES 4 to 7, $c_{2h}$, $n_h$ and $p_h$ become $c_6$, $n_3$ and $P_3$, $r=5$, and additional elements $c_o$, $p_o$, $n_{12}$ are incorporated. FIGURE 4 is a plan section through bridges $c_1$, $c_3$, $c_5$, $c_7$, $c_9$ and $c_{11}$ (C–D on FIGURES 6 and 7) and FIGURE 5 a similar plan section through the even-numbered bridges (E–F on FIGURES 6 and 7), the position of the thermoelements being shown by the dotted line. FIGURE 6 shows a vertical cross section through the line A–B on FIGURES 4 and 5 in which the bolt holes T are shown but not the bolts and FIGURE 7 is a similar vertical cross-section through the line L–M on FIGURES 4 and 5.

Figure 3:
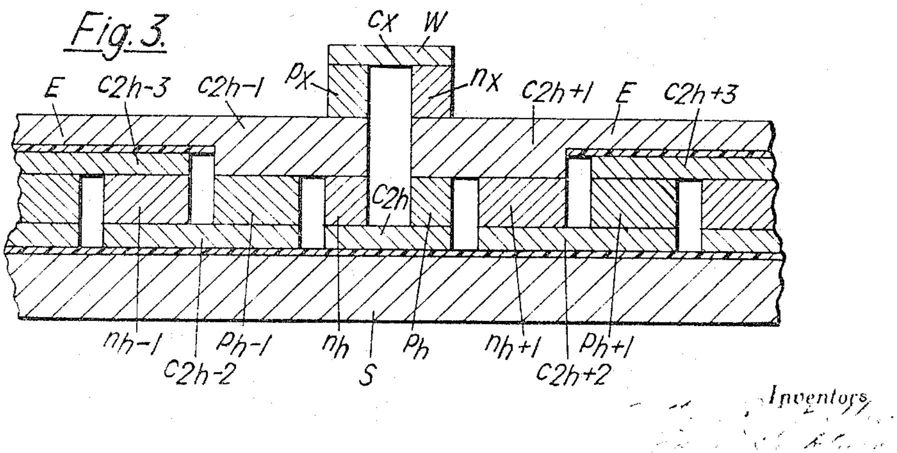
FIGURE 3 is a similar representation of a modification of the device of FIGURE 1.

FIGURE 3 corresponds to FIGURES 6 and 7 the components being uncoiled to a straight line for greater clarity, and element $c_5$, which is thermally and electrically connected to the left hand side heat conducting member, and left hand side copper leads L to the highest stage, being shown integrally with these as $c_{2h-1}$, and similarly on the right hand side with $c_7$ and $c_{2h+1}$.

The bolts of thermally and electrically insulating material provide a convenient and compact method consolidating the assembly to a firm whole. The gaps may be filled with a heat and electrically insulating material such as a foamed synthetic resin. The electrical leads preferably enter the assembly by the hot junctions of the lower stage as shown in FIGURES 2A, 4 and 5.

The heat sink or sinks S are heat-exchange members cooled in any convenient manner; they may advantageously be cooled by the cold junctions of a still lower stage thermoelectric cooling unit, thus rendering the whole a three-stage or higher multistage device. In particular the heat sinks may each be cooled by more than one thermoelectric cooling wafer.

The methods of connecting the two highest stages are illustrated in the following examples which relate equally to a two-stage device or to the highest two stages of a device having three or more stages.

*Example 1*

The lower (i.e., next to highest) stage is bolted in place complete with anodised aluminium plates E. Copper connecting leads L are fixed using epoxy resin.

The ends of these leads L overlie each aluminium plate E as shown in FIGURE 7. Prior to fixing the leads it is convenient to solder $p_x$ and $n_x$ in place using a bismuth tin solder. $C_x$ is soldered in place and finally the leads are soldered to $C_5$ and $C_7$ (FIGURE 6) to ensure good electrical connection. The position of the soldered connection is shown in FIGURE 7.

*Example 2*

The copper leads are soldered to the aluminium plate which lies between the highest and lower stages prior to anodising it. After anodising, $p_x$ and $n_x$ can be soldered in place with a bismuth tin solder taking care not to disturb the copper-aluminium soldered junction. The aluminium plates E are then used to bolt the lower stage in place.

The next step is to solder up bridge $C_x$. The soldered joints connecting the copper leads L to $C_5$ and $C_7$ can then be made good.

This method has the advantage of providing good thermal contact between the aluminium plates and copper bridges.

In both examples the smaller thermoelements (FIGURE 6) $p_x$, $n_x$, $p_3$ and $n_3$ are 5 mm. high and 4 x 4 mm. across, while the other thermoelements (see also FIGURE 5) are 6 mm. cubes so that the conductances are in the ratio of 3.2:6 or approximately 1:2. Thus the two branches connecting $C_5$ and $C_7$ have, taken together, substantially the same conductance as that between any $C_3$ and $C_5$ or $C_7$ and $C_9$.

In the form of the invention illustrated in FIGURES 3 to 7, the ring of thermoelements is formed by the components $n_3$, $c_6$, $p_3$, $c_7$, E, $L_2$, $n_x$, $c_x$, $p_x$, L, E, and $c_5$. Thus the bridging element to which the chains are attached are the composite elements $c_5$, E, L and $C_7$, LE.

In general the heat and electrically conducting elements are preferably of copper, silver or of nickel-plated copper, and the heat sinks and heat transfer members are of aluminium which may be anodised or coated with aluminium by flame spraying or other suitable process where electrical insulation is required. However, in FIGURE 1 the heat-sinks and the heat transfer members E may be constructed of beryllium oxide of suitable purity which being itself electrically insulating will not require to be insulated from the metallic bridges. These latter are then preferably constructed of silver, for example the even numbered *c's* may be layers of silver deposited on the heat sink in the appropriate pattern, and the odd numbered *c*'s except $c_{2h-1}$ and $c_{2h+1}$ may be similarly plated on to beryllium oxide heat conducting elements. The bridges $c_{2h-1}$ and $C_{2h+2k+1}$ must be fitted in to their respective heat conducting members and fit with good thermal contact and firmly enough to support the highest stage though further support may be given to this by thermally and electrically insulating material, e.g., in FIGURES 1–7 sandwiched between $p_x$ and its heat-conducting element and $n_x$ and its heat-conducting element.

In FIGURE 7 the anodised layers on the aluminium blocks may be replaced by flame sprayed alumina layers, or the aluminium blocks together with the anodised layers may be replaced wholly or in part by sheets or beryllium oxide of suitable purity to provide good electrical insulation and heat conductivity. The copper bridging elements may be replaced by deposited layers of silver.

Figure 8:
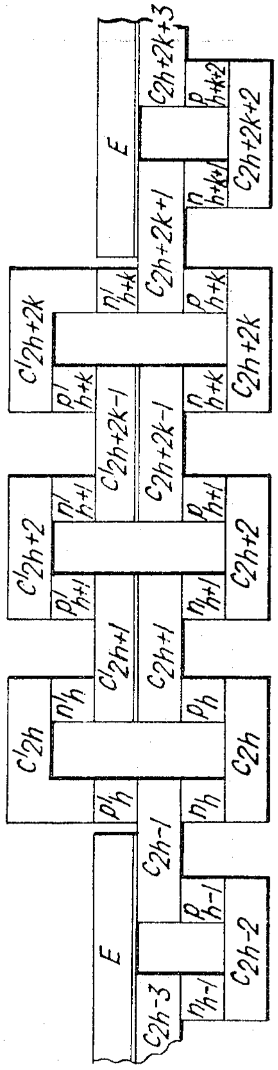
FIGURES 8 and 9 are schematic representations of two further forms of device according to the invention.

In FIGURE 8 the odd-numbered *c*'s from $C_{2+h1}$ to $c_{2h+2k-1}$ are in thermal contact and in back-to-back relationship with the corresponding $c''$s. The *c*'s may be integral with the corresponding $c''$s or alternatively they may be separated from the corresponding $c''$s by a thin film of electrically insulating material which provides the smallest possible hindrance to the passage of heat.

Some or all of these heat-transfer plates are constructed of beryllium oxide of such purity that it is sufficient electrically insulating not to require any separate electrically insulating material to separate it from the bridges.

Advantageously the gaps around the bridges are filled with beryllium oxide.

Where cooling at one spot only is required the couples will be so coiled that the even number bridges are brought close to each other and to the required spot.

Figure 9:
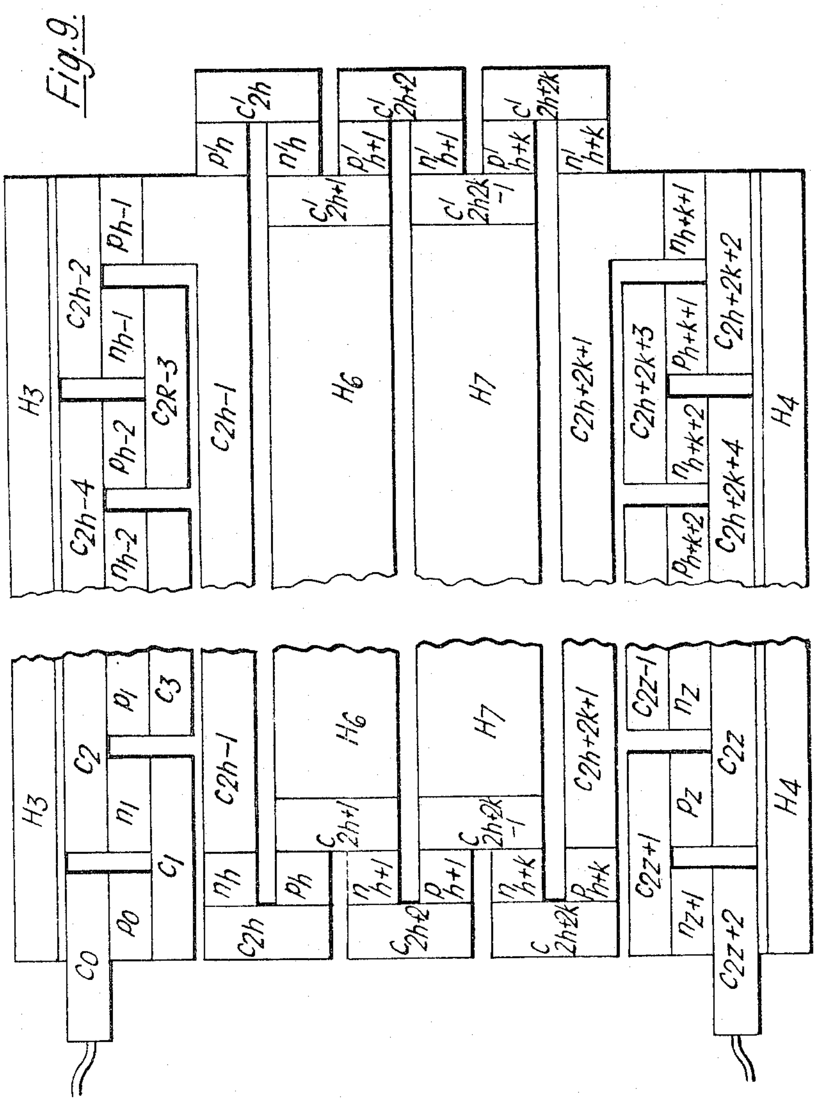

Referring to FIGURE 9, heat transfer plates $H_3$ and $H_4$ are of the type already referred to. Similar heat transfer plates may be associated with the even number $c''$s. The heat transfer plates $H_6$ and $H_7$ may be of conducting metal such as copper silver or aluminium, in which case they must be insulated electrically from each other. Alternatively, they may be constructed of electrically insulating material such as beryllium oxide, or of conducting metal but separated from the odd-numbered *c*'s and $c''$s by electrically insulating material providing minimum resistance to the passage of heat, in which case they may be integral with each other. The long members $c_{2h-1}$ and $c_{2h+2k+1}$ are electrically insulated from each other and from the other *c*'s but $c_{2h-1}$ is in thermal contact with the odd-numbered *c*'s from $c_3$ to $c_{2h-3}$ and preferably also with $c_1$ and may also optionally be in thermal contact with the heat-transfer plate $H_6$. Similarly, $c_{2h+2k+1}$ is in thermal contact with the odd-numbered *c*'s from $c_{2h+2k+3}$ to $c_{z-1}$ and preferably also with $c_{z-1}$ and preferably also with $c_{z+1}$ and optionally with the heat transfer plate $H_7$.

In general where the current is carried by two paths the thermoelements along these two paths will have dimensions such that the electrical resistance is double that of the other thermoelements which carry the full current.

*Example 3*

The assembly is carried out as described in Example 1, but in place of anodised aluminium plates there are used aluminium plates which have been coated on one side with alumina (as shown in FIGURE 7) by a suitable process such as flame-spraying using an oxy-acetylene flame.

*Example 4*

The assembly is carried out as described in Example 2, but the aluminium instead of being anodised is coated with alumina by flame spraying.

In a three-stage thermoelectric device in which the two higher stages have been constructed as described herein, and in which the hot junctions of the lowest stage were cooled by tap water at 10° C. we have obtained a temperature of −100° C. at the cold junctions of the highest stage.

We claim:

1. A thermoelectric device comprising a plurality of thermoelectric cooling elements arranged in first and second linking chains and first and second terminal chains, each said chain comprising thermoelements of one conductivity type; thermoelements of the opposite conductivity type alternating with the said thermoelement of said one type; thermally and electrically conducting bridges connecting adjacent thermoelements such that said bridges are on alternate sides of said chain whereby to provide a plurality of hot junctions on one side of each said chain and a plurality of cold junctions on the other side of each said chain, one cold junction bridge connected to a thermoelement of one conductivity type of said first linking chain and a thermoelement of the opposite conductivity type in said second linking chain and a thermoelement of the one conductivity type of said first terminal chain, a second cold junction bridge connected to a thermoelement of said opposite conductivity type in said first linking chain and a thermoelement of said one conductivity type in said second linking chain and a thermoelement of said opposite conductivity type in said second terminal chain.

2. The device specified in claim 1, wherein said first and second linking chains contain an equal number of thermoelements.

3. The device specified in claim 1, wherein the two terminal chains contain an equal number of thermoelements.

4. The device specified in claim 1, wherein each said terminal chain has at least as many thermoelements as said linking chains.

5. The device specified in claim 1, wherein at least one heat transfer element thermally connects at least two of said hot junction bridges of at least one of said terminal chains.

6. The device specified in claim 1, wherein at least one heat transfer element thermally connects at least one hot junction bridge of one of said linking chains to at least two bridges of at least one of said chains.

7. The device specified in claim 1 wherein at least one heat transfer member thermally connects at least two hot junction bridges of at least one of said linking chains.

8. The device specified in claim 6 wherein said heat transfer element is formed of aluminium coated with alumina.

9. The device specified in claim 6 wherein said heat transfer element is formed of beryllium oxide.

10. A device as specified in claim 1 in which a beryllium oxide plate connects the hot junction bridges of one of said linking chains.

11. A device as specified in claim 1 in which a thin film of electrically insulating material separates the hot junction bridges of said first linking chain and the cold junction members of said second linking chain.

12. A device as specified in claim 11 wherein said material is a resin containing a heat transfer promoting filler.

13. The device specified in claim 1 in which said cold junction bridges of said terminal chains and of said second linking chain and the hot junction bridges of said first linking chain are surrounded by beryllium oxide.

14. A thermoelectric cooling device comprising, in combination at least two devices as defined in claim 1 connected electrically in series the thermoelements of the combination alternating in type.

References Cited by the Examiner

UNITED STATES PATENTS

| | | | |
|---|---|---|---|
| 2,844,638 | 7/1958 | Lindenblad | 136—4 |
| 3,054,840 | 9/1962 | Alsing | 136—4 |
| 3,085,405 | 4/1963 | Frantti | 62—3 |

FOREIGN PATENTS

| | | |
|---|---|---|
| 1,265,435 | 5/1961 | France. |

ALLEN B. CURTIS, *Primary Examiner.*

WILLIAM J. WYE, WINSTON A. DOUGLAS, *Examiners.*